United States Patent [19]

Sato

[11] Patent Number: 5,392,128
[45] Date of Patent: Feb. 21, 1995

[54] STILL VIDEO DEVICE THAT RECORDS/REPRODUCES A PLURALITY OF IDENTICAL SIGNALS

[75] Inventor: Koichi Sato, Tokyo, Japan

[73] Assignee: Asahi Kogaku Kogyo Kabushiki Kaisha, Tokyo, Japan

[21] Appl. No.: 46,373

[22] Filed: Apr. 12, 1993

Related U.S. Application Data

[63] Continuation of Ser. No. 802,847, Dec. 6, 1991, abandoned.

[30] Foreign Application Priority Data

| Dec. 10, 1990 | [JP] | Japan | 2-414128 |
| Dec. 10, 1990 | [JP] | Japan | 2-414129 |
| Dec. 10, 1990 | [JP] | Japan | 2-414130 |

[51] Int. Cl.$^6$ .................................. H04N 9/76
[52] U.S. Cl. .................................. 358/335; 358/310; 358/906; 358/342; 358/322; 358/320; 358/330; 358/337; 360/33.1; 360/30
[58] Field of Search ............... 358/335, 310, 906, 909, 358/342, 337, 330, 322, 320; 360/33.1, 10.1, 32, 35.1, 29, 30

[56] References Cited

U.S. PATENT DOCUMENTS

| 4,691,253 | 9/1987 | Silver | 358/906 |
| 4,794,468 | 12/1988 | Murakoshi | 358/342 |
| 4,797,752 | 1/1989 | Giddings | 358/342 |
| 4,939,593 | 7/1990 | Yuuchi et al. | 358/336 |
| 4,989,078 | 1/1991 | Paxton | 358/342 |
| 5,012,351 | 4/1991 | Isono et al. | 358/343 |
| 5,027,230 | 6/1991 | Nakayama | 358/313 |
| 5,038,220 | 8/1991 | Eguchi | 358/310 |
| 5,047,875 | 9/1991 | Kozuki et al. | 360/35.1 |
| 5,086,345 | 2/1992 | Nakane et al. | 358/906 |
| 5,119,208 | 6/1992 | Fujimoto | 358/310 |
| 5,121,261 | 6/1992 | Isogai et al. | 360/32 |
| 5,179,453 | 1/1993 | Tozaki | 358/342 |

FOREIGN PATENT DOCUMENTS

| 0369724 | 5/1990 | European Pat. Off. |
| 2935328 | 4/1980 | Germany. |
| 60-158784 | 8/1985 | Japan. |
| 62-247695 | 10/1987 | Japan. |
| 63-313382 | 12/1988 | Japan. |
| 64-82777 | 3/1989 | Japan. |
| 1177290 | 7/1989 | Japan. |
| 1268275 | 10/1989 | Japan. |

OTHER PUBLICATIONS

Translation of the German Office Action dated Aug. 31, 1992.
French Search Report and Annex.
Patent Abstracts of Japan, vol. 13, No. 307 (E-787).
Patent Abstracts of Japan, vol. 12, No. 118 (E-600).
Patent Abstracts of Japan, vol. 14, No. 36 (E-877).
Patent Abstracts of Japan, vol. 13, No. 152 (P-856).
Patent Abstracts of Japan, vol. 13, No. 459 (E-832).
Patent Abstracts of Japan, vol. 9, No. 328 (E-369).
"Television Technics & Electronics" Sep., 1985; vol. 33, pp. 83–89, and english translation of the highlighted portion of pp. 85–87.

*Primary Examiner*—Tommy P. Chin
*Assistant Examiner*—Khoi Truong
*Attorney, Agent, or Firm*—Sandler, Greenblum & Bernstein

[57] ABSTRACT

A still video device in which identical image signals for one still image are recorded in two tracks of a recording medium, and the image signals recorded in the tracks are reproduced. The still video device has two magnetic heads for recording and reproducing the image signals. The image signals reproduced by the two magnetic heads are added together. An envelop-detected signal of the added-together image signals is obtained, and a phase of the reproduced signal is controlled in such a manner that the envelop-detected signal reaches a maximum value, whereby a C/N ratio of the reproduced signal is improved. Further, the recording mode of the image signals are determined based on the added-together image signals.

6 Claims, 13 Drawing Sheets

STILL VIDEO DEVICE THAT RECORDS/REPRODUCES A PLURALITY OF IDENTICAL SIGNALS

This application is a continuation of application Ser. No. 07/802,847, filed Dec. 6, 1991, now abandoned.

BACKGROUND OF THE INVENTION

1. Field of the Invention

The present invention relates to a still video device, and more particularly, to an improved construction of a still video camera in which image signals are recorded on a recording medium, such as a magnetic disk.

2. Description of the Related Art

Usually, a magnetic disk is used as a recording medium in a still video device, and usually, two methods are used for recording or reproducing image signals to and from the magnetic disk; i.e.; a field mode, in which only one track is used for one image plane; or a frame mode, in which two tracks are used for one image plane. In these methods, when an uneven coating of a magnetic powder, for example, exists on a surface of the magnetic disk, a signal dropout occurs, whereby an image corresponding thereto is distorted. Accordingly, an interpolation of image signals is carried out to prevent this distortion of the image.

Nevertheless, such an interpolation can not completely correct an image. Therefore, when a dropout occurs, a true image of the object can not be obtained.

Further, in the field mode, when image signals of one page are to be deleted, if image signals of another track, which should not be deleted, are deleted due to an erroneous operation, the deleted image signals cannot be restored.

SUMMARY OF THE INVENTION

Therefore, an object of the present invention is to provide a still video device by which a true image of an object can be obtained without fail, and by which an identical image can be restored when image signals are erroneously deleted.

According to the present invention, there is provided a still video device that comprises a mechanism for generating a group of image signals for one still image, and a mechanism for recording the group of image signals to a plurality of areas of a recording medium.

Another object of the present invention is to provide a still video device in which the image signals are recorded in a plurality of areas of a recording medium, and a high quality image is obtained from the recording medium without the need to improve the performance of the recording medium.

According to the present invention, there is provided a still video device that comprises a mechanism for reproducing identical image signals which are recorded in a plurality of areas of recording medium, and a mechanism for adding a plurality of the image signals together.

A further object of the present invention is to provide a still video device by which it is determined that a recording mode of a recording medium is that in which the image signals are recorded in a plurality of areas of the recording medium.

According to the present invention, there is provided a still video device that comprises mechanism for reproducing a plurality of the image signals which are recorded in a plurality of areas of the recording medium, a mechanism for adding a plurality of the image signals together, and a mechanism for determining a type of recording mode by which the image signals are recorded in the recording medium, based on the image signals added by the adding mechanism.

BRIEF DESCRIPTION OF THE DRAWINGS

The present invention will be better understood from the description of the preferred embodiments of the invention set forth below, together with the accompanying drawings, in which.

DESCRIPTION OF THE PREFERRED EMBODIMENTS

Figure 1:
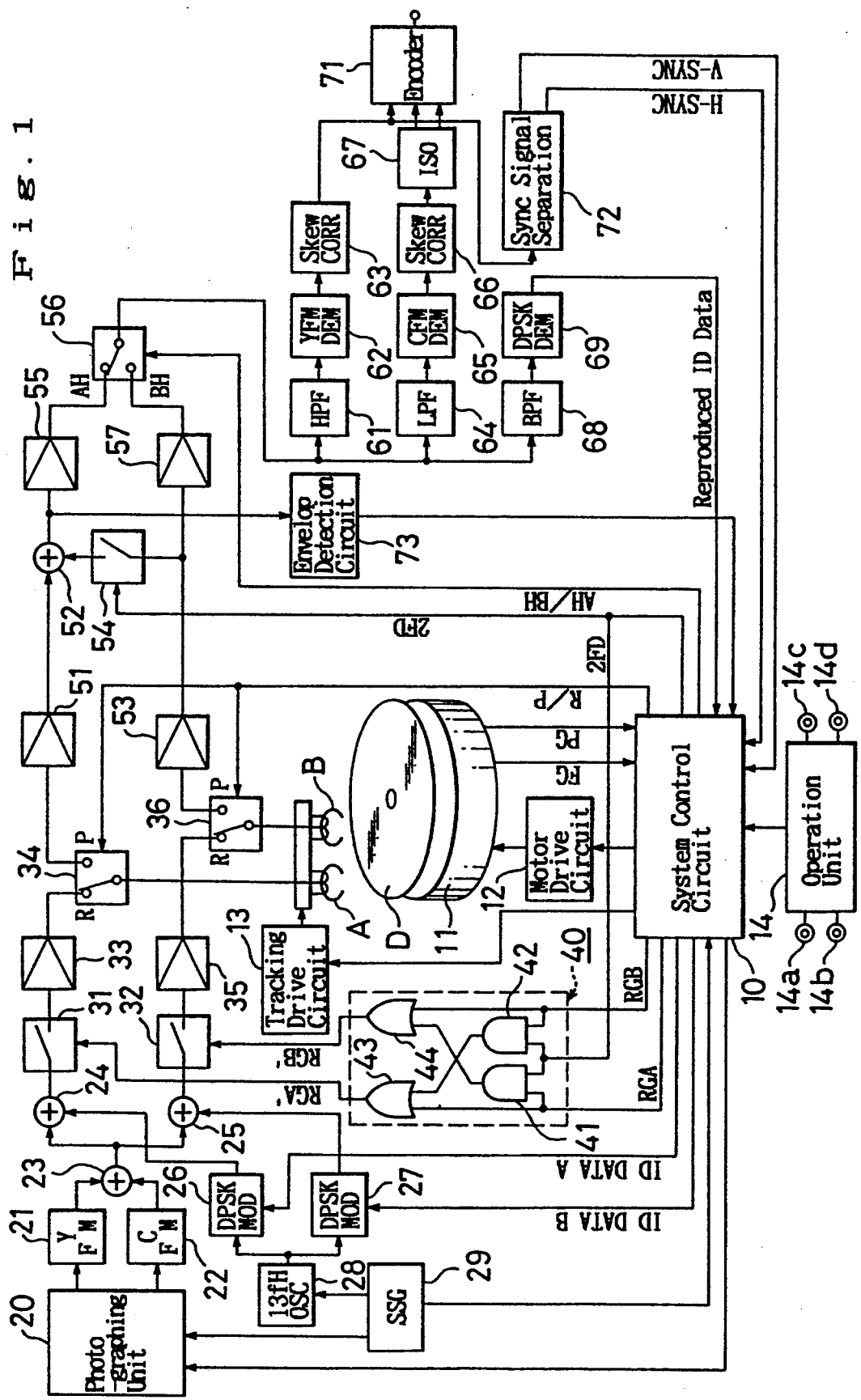
FIG. 1 is a circuit diagram showing a still video device relating to a first embodiment according to the present invention.

The present invention will now be described with reference to embodiments shown in the drawings.

FIG. 1 shows a still video device according to a first embodiment of the invention, wherein the still video device uses a magnetic disk D as a recording medium. A system control circuit 10, which is a microcomputer, controls the present device as a whole. The system control circuit 10, controls the recording of a photographed image in the magnetic disk D, and the reproduction of image signals recorded in the magnetic disk D.

The magnetic disk D is rotated by a spindle motor 11 that is driven and controlled by a motor drive circuit 12.

The spindle motor 11 outputs one PG pulse and a predetermined number of FG pulses per one rotation of the magnetic disk D, and the system control circuit 10 controls the rotation of the spindle motor 11 based on these pulse signals, to thereby cause the magnetic disk D to be rotated at a predetermined velocity. Two magnetic heads A and B are provided for recording image signals to the magnetic disk D and reproducing the image signals from the magnetic disk D. The magnetic heads A and B are controlled by a tracking drive circuit 13 to be positioned at a predetermined track of the magnetic disk D. The tracking drive circuit 13 is also controlled by the system control circuit 10.

An operation unit 14 is connected to the system control circuit 10. The operation unit 14 comprises a change switch 14a, a selector switch 14b, a head feed switch 14c and a release switch 14d. The change switch 14a is provided for setting either a recording or reproduction of image signals at the magnetic disk D. The selector switch 14b is provided for selecting either a 1-track field mode, a 2-track field mode, or a frame mode. In the 1-track field mode, a recording is executed by either the magnetic head A or B, and in the 2-track field mode, identical image signals are recorded to two tracks by the magnetic heads A and B. The head feed switch 14c is used to make the magnetic head A or B move to a predetermined track position during a reproduction. Note, when recording, the magnetic heads A and B are constructed in such a manner that they can be automatically positioned at an empty track position, respectively. The release switch 14d is used for carrying out a photographing by means of the still video device.

The construction used for recording image signals in the magnetic disk D in this embodiment is described below.

A photographing unit 20 is provided with a solid state imaging device (CCD), etc., and is controlled by the system control circuit 10 to form an image on the CCD, and at the same time, output this image as separated luminance signals and color signals. The luminance signals and color signals are FM-modulated, respectively, by a luminance signal FM modulation circuit 21 and a color signal FM modulation circuit 22. The FM modulation circuits 21 and 22 are respectively connected to an adder 23. Accordingly, the FM-modulated luminance signal and color signal are superimposed together by the adder 23, whereby image signals corresponding to one still image are generated.

The adders 24 and 25 are connected to the adder 23, and the same image signals are fed to adders 24 and 25. DPSK modulation circuits 26 and 27 are respectively connected to adders 24 and 25. The DPSK modulation circuits 26 and 27 are provided for generating DPSK signals of ID data, which comprises a track number recorded in the magnetic disk D, and photographing date, and DPSK-modulate (differential phase shift keying modulate) a carrier outputted from a carrier generating circuit 28, in accordance with the ID data outputted from the system control circuit 10. The carrier generating circuit 28 generates the carrier in accordance with pulse signals outputted from a pulse generating circuit 29.

Figure 2:
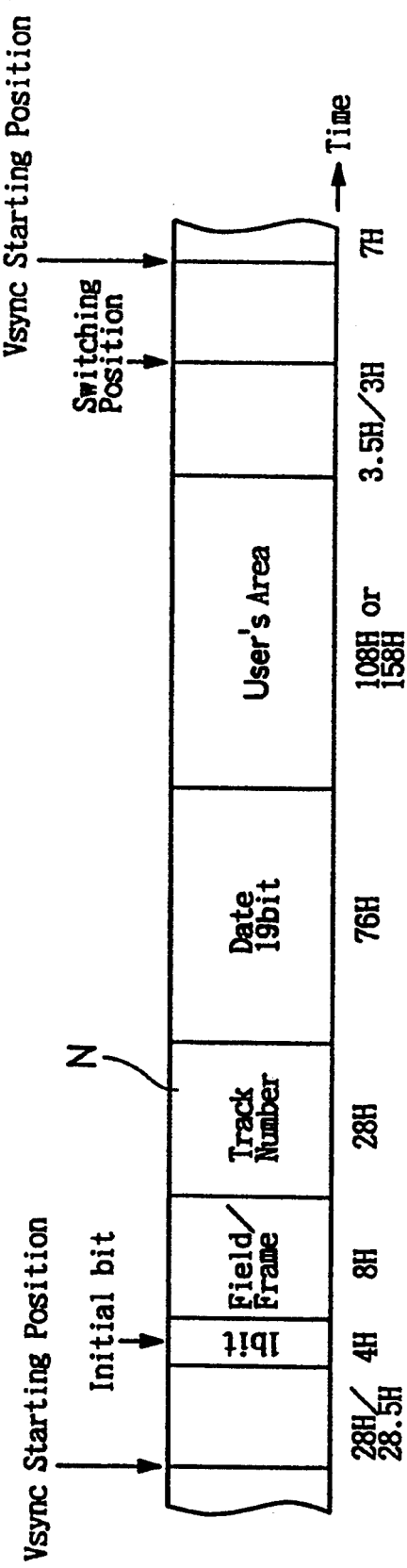
FIG. 2 is a view showing the ID data.

The ID data is described with reference to FIG. 2. In FIG. 2, "H" refers to the one horizontal scanning line. The composition itself of the ID data is the same as that used for a conventionally known still video device, but, in this embodiment, the system control circuit 10 controls the ID data so that track number N of each ID data corresponding to the two image signals is set to corresponding track number, respectively. For example, where an image is recorded to first and second tracks according to the 2-track field mode, a track number showing the first track is recorded in the ID data of the first track, and the track number showing the second track is recorded in the ID data of the second track, respectively. Namely, the track number N is assigned to the corresponding track by the system control circuit 10. Based on the ID data including the predetermined track number N, the carriers outputted from the carrier generating circuit 28 are DPSK-modulated by the DPSK modulating circuits 26 and 27 and are fed to adders 24 and 25.

Thus, during the 2-track field mode, two identical image signals corresponding to one still image are generated, and the ID data corresponding to tracks in which each image signal is recorded is superimposed on each image signal.

First and second record gate 31 and 32 are connected to each of the adders 24 and 25, respectively. The first record gate 31 is connected to record terminal R of switch 34, through a record amplifier 33, and the second record gate 32 is connected to record terminal R of switch 36, through a record amplifier 35. The first and second record gates 31 and 32 are controlled by a gate control circuit 40, to be closed by a HIGH signal (command signals RGA' and RGB' described later) and opened by a LOW signal. As described later, during the 2-track field mode, the first and second record gates 31 and 32 are both closed, thereby causing identical image signals to be recorded on the two tracks of the magnetic head disk D. Switches 34 and 36 are controlled by the system control circuit 10, such that, when image signals are recorded in the magnetic disk D, they are switched to the record side position R, and when image signals recorded in the magnetic disk D are reproduced, they are switched to a reproduction position P.

The gate control circuit 40 comprises AND gates 41 and 42 and OR gates 43 and 44. A command signal RGA, a command signal RGB, and a command signal 2FD are inputted to gates 41, 42, 43, and 44 from the system control circuit 10. The command signal RGA is outputted by the system control circuit 10 to execute a recording to the magnetic disk D through magnetic head A; the command signal RGB is outputted by the system control circuit 10 to execute a recording to the magnetic disk D through magnetic head B; and the command signal 2FD is outputted by the system control circuit 10 to execute a recording to the magnetic disk D through magnetic heads A and B (i.e., the 2-track field mode).

Command signal RGA is inputted to a first input terminal of the AND gate 41, and the command signal 2FD is inputted to a second input terminal of the AND gate 41. Command signal RGB is inputted to a first input terminal of the AND gate 42, and command signal 2FD is inputted to a second input terminal of the AND gate 42. The output terminal of the AND gate 41 is connected to a first input terminal of the OR gate 44, and command signal RGB is inputted to a second input end of the OR gate 44. The output terminal of the AND gate 42 is connected to a first input terminal of the OR gate 43, and the command signal RGA is inputted to a second input terminal of the OR gate 43. The output terminal of the OR gate 43 is connected to the first record gate 31, and the output terminal of the OR gate 44 is connected to the second record gate 32. Accordingly, the command signals RGA' and RGB' are fed from the OR gates 43 and 44 to the first and the second record gates 31 and 32 respectively, and the first and the second record gates 31 and 32 are opened and closed by these command signals RGA' and RGB'.

A recording of image signals of a still image to the magnetic disk D, is described with reference to FIGS. 1 and 3.

During a recording to the magnetic disk D, the change switch 14a of the operation unit 14 is switched to the record position, and further, as shown by reference E (see FIG. 3) PG pulses are outputted periodically at every one rotation of the magnetic disk D.

When the selector switch 14b is set to the 1-track field mode, command signal I denoting this mode is outputted, and command signal J denoting the 2-track field mode is not outputted. Accordingly, LOW signals are inputted to the second input terminals of AND gates 41 and 42 of the gate control circuit 40. Thus, AND gates 41 and 42 output LOW signals, respectively. Further, command signals RGA and RGB are inputted to the second input terminals of OR gates 43 and 44, respectively. Accordingly, OR gates 43 and 44 output signals corresponding to command signals RGA and RGB, regardless of the LOW signals outputted from AND gates 41 and 42. Namely, in the 1-track field mode, a command signal RGA', corresponding to command signal RGA inputted to the gate control circuit 40, is outputted from OR gate 43, and a command signal RGB', corresponding to command signal RGB, is outputted from OR gate 44.

The magnetic head used in the 1-track field mode is specified in advance to, for example, magnetic head A. In this case, command signal RGA is outputted from the system control circuit 10. Accordingly, command signal RGA' is outputted from the gate control circuit 40. As shown by reference L, command signal RGA' is outputted for one period of the PG pulse when the release switch 14d is pressed and release signal M is outputted. As a result, while the magnetic disk D is rotated by one revolution, the first record gate 31 is closed and a recording to the magnetic disk D is carried out by magnetic head A.

Next, a case in which the selector switch 14b is set to the 2-track field mode is described. In this case, command signal J denoting this mode, i.e., a HIGH signal, is outputted from the system control circuit 10, and this HIGH signal is inputted to the second input terminals of AND gates 41 and 42. Accordingly, HIGH signals are outputted from the output terminals of AND gates 41 and 42, to which command signal RGA or RGB is inputted. Namely, if command signal RGA is inputted to the gate control circuit 40, OR gate 43 outputs the command signal RGA', and because AND gate 41 outputs a HIGH signal, OR gate 44 outputs command signal RGB'. Further, if command signal RGB is inputted to the gate control circuit 40, AND gate 42 outputs a HIGH signal, and in the above case also, OR gates 43 and 44 output command signals RGA' and RGB', respectively.

Therefore, in the 2-track field mode, when command signal RGA or RGB is inputted to the gate control circuit 40, the gate control circuit 40 outputs command signals RGA' and RGB' from OR gates 43 and 44, respectively. Accordingly, together with an output of the release signal M, command signals RGA' and RGB' are outputted at the same time, as shown by references S and T, in synchronization with an output of the PG pulse, whereby the switches of the first and the second record gates 31 and 32 are closed and a recording to the magnetic disk D is executed. Namely, identical image signals are recorded in two tracks of the magnetic disk D.

In the frame mode, when the selector switch 14b is set to this mode position, the system control circuit 10 outputs command signal K denoting this mode, and command signal J for the 2-track field model is not outputted. Accordingly, when command signals RGA and RGB are inputted from the system control circuit 10 to the gate control circuit 40, the gate control circuit 40 outputs command signals RGA' and RGB' in synchronization with command signals RGA and RGB, respectively. In the frame mode, as is well known, an interlaced scanning is carried out, whereby one image is divided into two fields to be recorded. In this mode, the system control circuit 10 outputs command signal RGA, and after a recording is carried out to a predetermined track of the magnetic disk D through magnetic head A, the system control circuit 10 outputs command signal RGB and allows a recording to be executed to the next track through magnetic head B.

Namely, as shown by references U and V, the gate control circuit 40 outputs command signal RGA' during one revolution of the magnetic disk D, and subsequently, outputs command signal RGB' during a next revolution of the magnetic disk D. Accordingly, while the magnetic disk D is rotated by one revolution, the first record gate 31 is closed, and a recording to the magnetic disk D is executed by the magnetic head A. Then, while the magnetic disk D is rotated by a subsequent one revolution, the second recording gate 32 is closed and a recording to the magnetic disk D is executed by magnetic head B.

A construction by which image signals recorded in the magnetic disk D are reproduced is described below.

Figure 4:
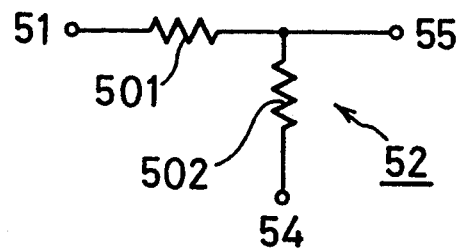
FIG. 4 is an example of a circuit diagram showing an adder.

When image signals, etc., of the magnetic disk D are to be reproduced, switches 34 and 36 are switched to reproduction positions P, respectively, whereby a reproduction terminal P of switch 34 is connected to an adder 52 through a head amplifier 51. Reproduction terminal P of switch 36 is connected to adder 52 through a head amplifier 53 and a switch 54. The adder 52 is constituted, for example, by connecting two resistors 501 and 502 as shown in FIG. 4. Switch 54 is opened and closed by command signal 2FD that is outputted from the system control circuit 10 and denoting the 2-track field mode. Adder 52 is connected to switch 56 through an automatic gain control (AGC) amplifier 55, and head amplifier 53 is connected to switch 56 through AGC amplifier 57. Switch 56 is switched by a head change signal outputted by the system control circuit 10. The head change signal denotes which of the magnetic heads A and B is to be used for a reproduction of signals recorded in the magnetic disk D.

Output terminal of switch 56 is connected through a high-pass filter 61 to a luminance signal FM-demodulating circuit 62, and connected through a skew correction circuit 63 to an encoder 71 and a synchronizing signal separating circuit 72. The skew correction circuit 63 is provided for carrying out a correction to eliminate distortion of an image in a recording operation by the field mode. The synchronizing signal separating circuit 72 is provided for picking up a horizontal synchronizing signal Hsync and a vertical synchronizing signal Vsync from the luminance signals. The horizontal synchronizing signal Hsyne and vertical synchronizing signal Vsync are inputted to the system control circuit 10 and are used, for example, for reading ID data, etc.

Further, the output terminal of switch 56 is connected through a low-pass filter 64 to a color signal FM-demodulating circuit 65 connected to the encoder 71 through a skew correction circuit 66 and an isochronizing circuit 67 that is provided for outputting color differential signals (R-Y, B-Y) simultaneously at every one horizontal scanning line. Therefore, a luminance signal and a color differential signal which correspond to the specified horizontal scanning line are inputted to the encoder 71, and the encoder 71 generates video signals in accordance with the luminance signal and the color differential signal.

Furthermore, the output terminal of switch 56 is connected to a DPSK-demodulating circuit 69 through a band-pass filter 68, and the DPSK-demodulating circuit 69 is connected to the system control circuit 10, and accordingly, ID data is inputted to the system control circuit 10 through the DPSK-demodulating circuit 69.

An envelop detecting circuit 73 is connected between adder 52 and AGC amplifier 55. The envelop detecting circuit 73 carries out an envelop detection of reproduction signals, and the envelop-detected output signals are inputted to the system control circuit 10. The system control circuit 10 executes a fine tuning of the magnetic heads A, B in such a manner that a voltage of the envelop-detected output signal reaches a highest value, whereby the optimum reproduction signals are obtained, as described later.

A reproduction of image signals of a still image recorded in the magnetic disk D is described below with reference to FIGS. 1 and 3.

In the reproduction mode, change switch 14a of the operation unit 14 is switched to the reproduction position, whereby switches 34 and 36 are switched to the reproduction terminals P, respectively. Then, by operating head feed switch 14c, magnetic heads A and B are positioned at predetermined tracks of the magnetic disk D.

Figure 3:
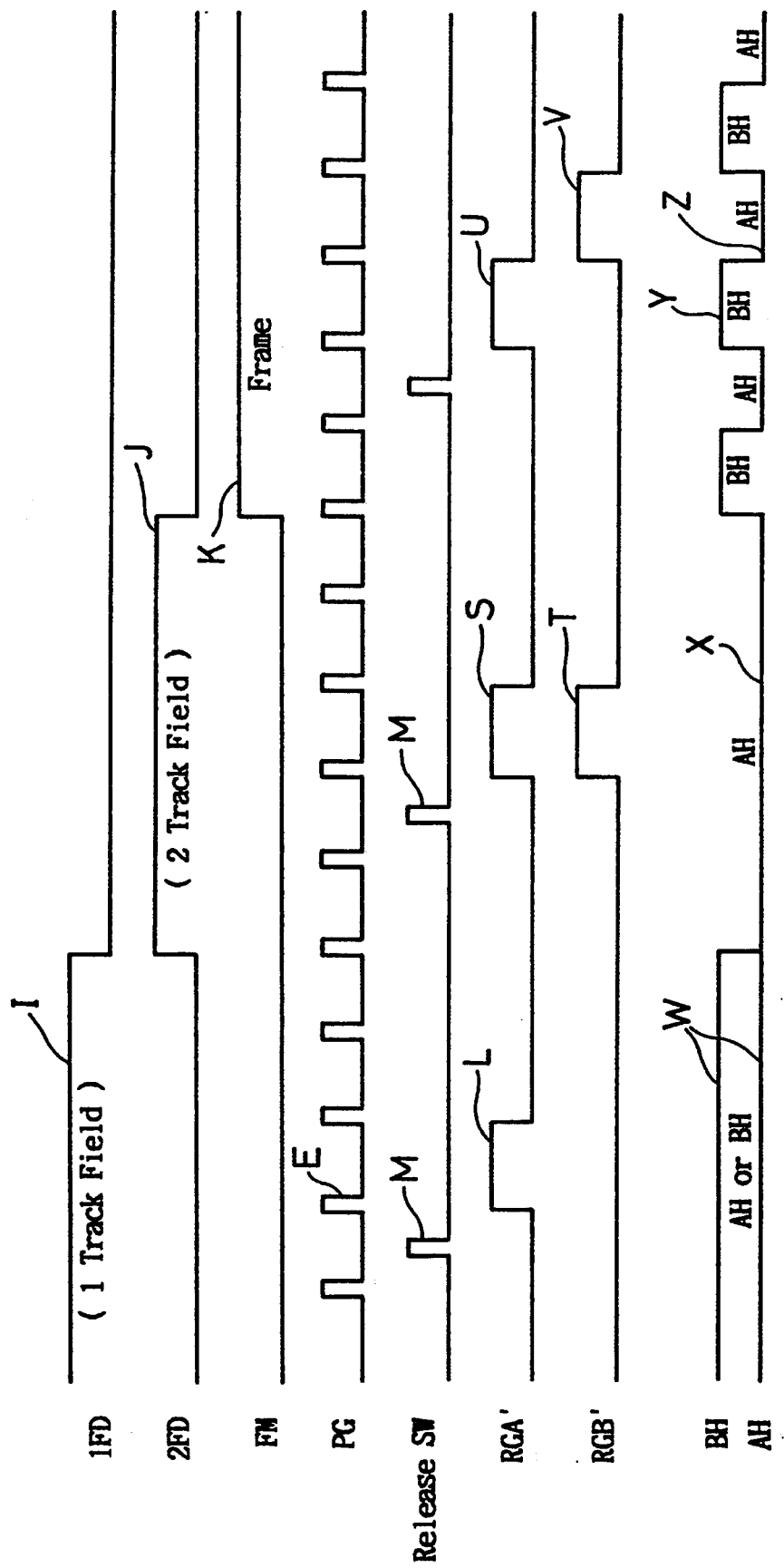
FIG. 3 is a timing chart showing a recording operation and a reproducing operation of image signals.

When the 1-track field mode is selected by selector switch 14b, switch 54 is open, and as shown in FIG. 3, a command signal W for operating one of the magnetic heads A and B, is outputted from the system control circuit 10, and thus, switch 56 is switched to the position corresponding to magnetic head A or B, whichever has been selected in advance (for example, magnetic head A). Accordingly, in this case, the signals read by magnetic head A pass through switch 34, head amplifier 51, adder 52, AGC amplifier 55 and switch 56, and are FM-demodulated by luminance FM-demodulating circuit 62 and color signal FM demodulating circuit 65, or are DPSK-demodulated by the DPSK-demodulating circuit 69. Note that the signals read by magnetic head B are not FM-demodulated or DPSK-demodulated, because switches 54 and 56 are open.

As described above, the image signals read by one of the magnetic heads A and B are converted to video signals and outputted from the encoder 71, and the ID data corresponding thereto is inputted to the system control circuit 10 to be decoded.

Conversely, when the 2-track field mode is selected by selector switch 14b, switch 54 is closed and switch 56 is switched to the side of magnetic head A by command signal X. Accordingly, reproduction signals read by magnetic head A are transmitted to adder 52 through switch 34 and amplifier 51, and reproduction signals read by magnetic head B are transmitted to adder 52 through switch 36, amplifier 53 and switch 54, respectively. The two kinds of reproduction signals are added together by adder 52, and the added-together reproduction signals pass through amplifier 55 and switch 56 and are FM-demodulated by fM-demodulating circuits 62 and 65, or are DPSK-demodulated by DPSK-demodulating circuit 69.

Ideally, the reproduction signals read by magnetic heads A and B will be identical to each other, but in practice, these signals contain noise, respectively. In the reproduction signals, naturally required signal components including an image, etc., have the same phase, respectively. Therefore, when the resistance values of resistors 501 and 502 are identical, the voltage of the signals outputted from adder 52 will be an arithmetic mean of the two kinds of reproduction signals. Further, since noise included in the two kinds of reproduction signals has different phases, the voltage of noise outputted from adder 52 is a result of taking the sum of a square relative to the voltages of the noise in the two reproduction signals, and dividing the square root of the above sum by 2. Namely, the voltage of a component showing an image, etc., included in reproduction signals is not changed due to the adder 52, but noise is changed by approximately 0.7 times. Accordingly, the C/N ratio (carrier vs. noise ratio) of the reproduction signals is increased by approximately 1.4 times as a result of the operation of the adder 52.

When the frame mode is selected by selector switch 14b, switch 54 is opened, and command signal Y for actuating the magnetic head B, and command signal Z for actuating the magnetic head A, are alternately outputted in synchronization with PG pulses, from the system control circuit 10. Accordingly, switch 56 is alternately switched to one of the magnetic heads A or B, whereby image signals corresponding to one image are generated, and are outputted as video signals by encoder 71.

As described above, this embodiment is constructed in such a manner that identical image signals can be recorded in two tracks of the magnetic disk D. Accordingly, for example, where a dropout has occurred in image signals of one of the tracks when a reproduction is carried out under the 1-track field mode, the image signals of the other track are reproduced by moving the magnetic head A to the other track, or by changing to a reproduction by the magnetic head B, whereby a still image having no distortion can be reproduced. Recording to two tracks as described above is especially effective when applied to important images such as photographic evidence, etc.

Further, according to this embodiment, even if signals of a track are erroneously deleted, the desired image signals can be reproduced, as described above, by changing a magnetic head to the other track or changing from one magnetic head to the other, as an identical image is stored in the other track.

Figure 7:
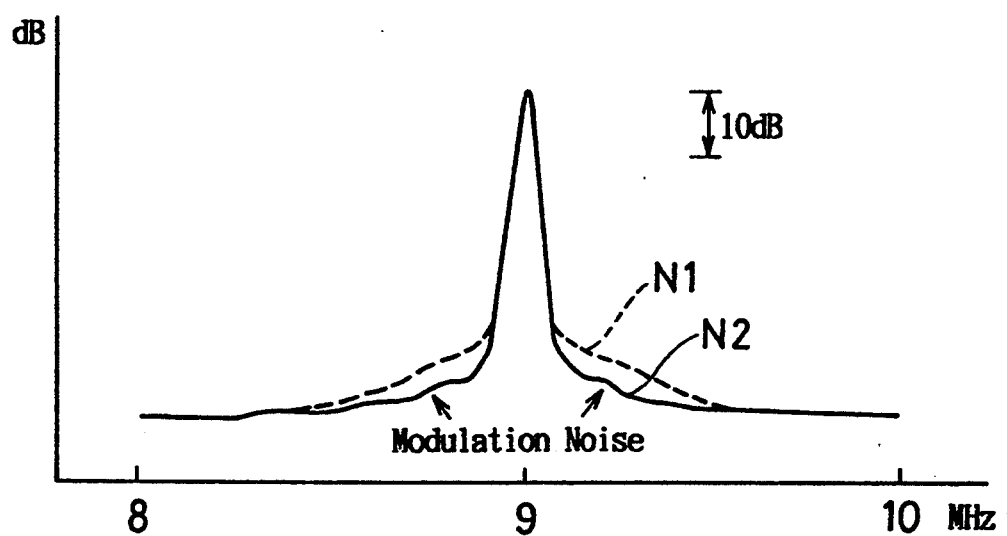
FIG. 7 is a diagram showing a carrier wave in which noise is reduced according to an embodiment of the present invention and a carrier wave of a conventional device, as a comparison thereof.

Furthermore, in the construction of this embodiment, two kinds of signals reproduced by the magnetic heads A and B are added together by adder 52, whereby the C/N ratio of the reproduction signals are increased. FIG. 7 shows an example of an improved carrier produced by this embodiment, i.e.; a carrier outputted by adder 52. It can be understood from this drawing that, although modulation noise is included in a carrier, as shown by broken line N1, in conventional device, the modulation noise is reduced according to this embodiment as shown by a solid line N2. According to the present embodiment, even if a magnetic disk having the same performance as a conventional disk is used for a still video device, the C/N ratio of the reproduction signals is improved. As a result, the S/N ratio is improved, whereby a still image having a high quality is obtained.

Figure 5:
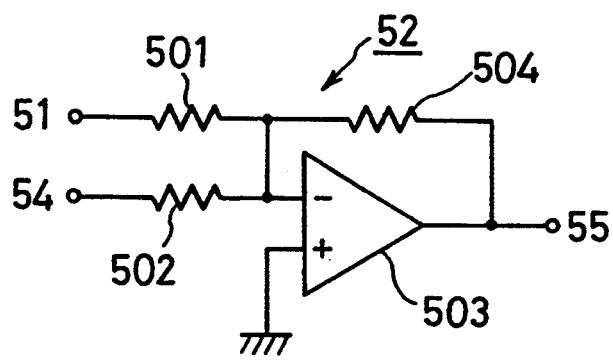
FIG. 5 is another example of a circuit diagram showing an adder.

FIG. 5 shows another example of the adder 52. In this example, resistances 501 and 502 are connected to an inverting input of an operational amplifier 503, and a feedback resistance 504 is provided between an output terminal and the inverting input of the operational amplifier 504 for a gain adjustment. Adder 52 having this construction provides the same effect as adder 52 shown in FIG. 4.

Figure 6:
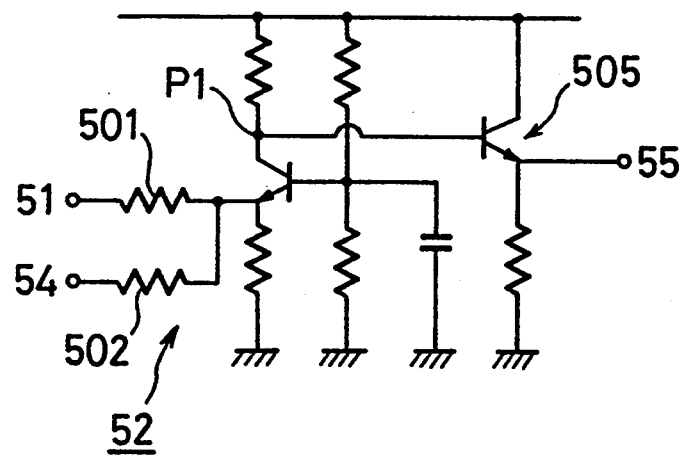
FIG. 6 is another example of a circuit diagram showing an adder.

FIG. 6 shows still another example of the adder 52. This example is provided with a common base amplifier. In this construction, when voltages are supplied through resistances 501 and 502 from head amplifier 51 and switch 54 is switched over, due to this switching, a voltage at point P1 is varied. Thus, a voltage supplied to AGC amplifier 55 through an emitter follower 505 is changed. According to this construction, the same effect is obtained as that provided by the adders 52 shown in FIGS. 4 and 5.

Figure 8:
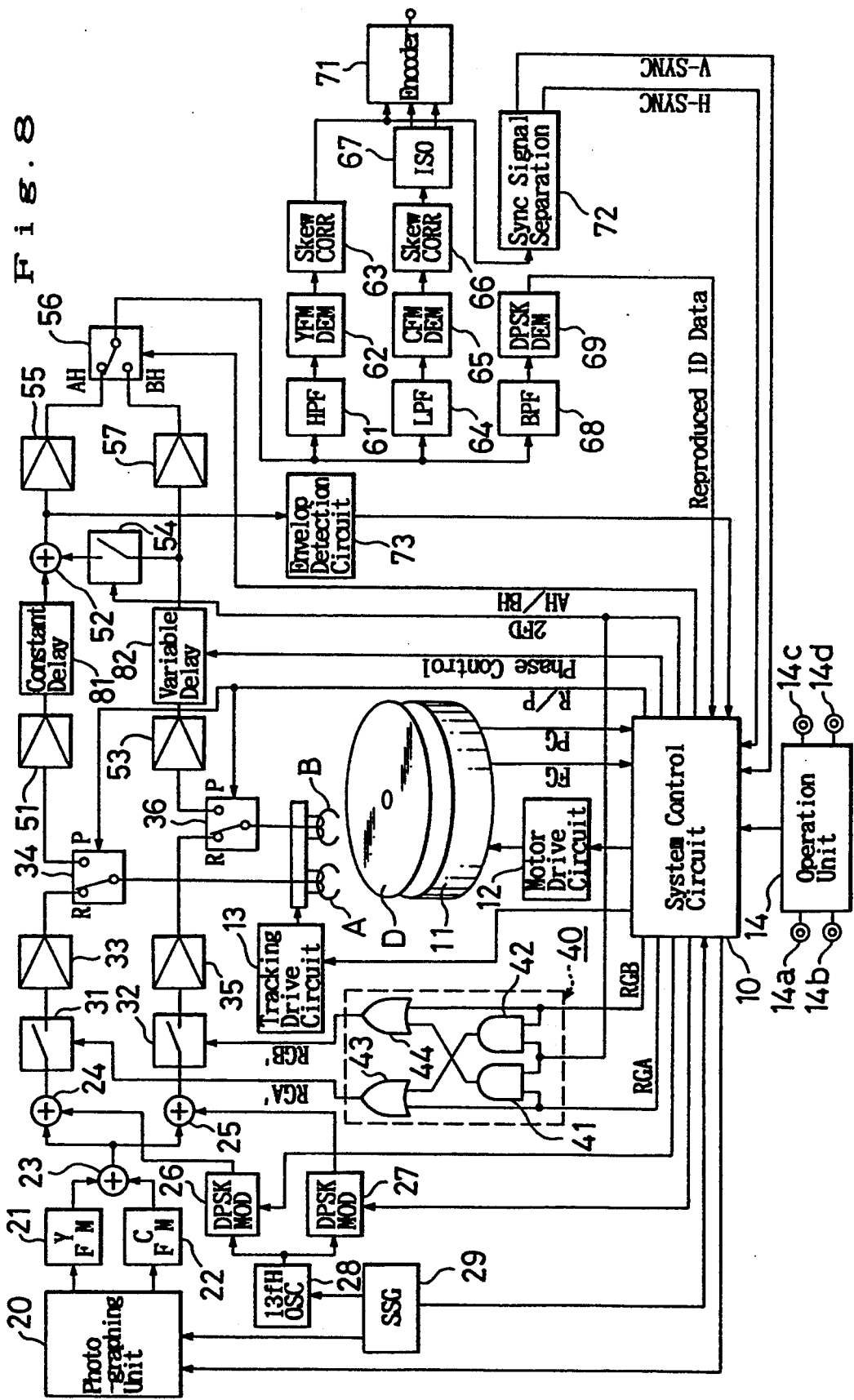
FIG. 8 is a circuit diagram showing a still video device relating to a second embodiment according to the present invention.

FIG. 8 shows still video device according to a second embodiment of the present invention.

Usually, a phase difference exists between reproduced signals obtained through the magnetic heads A and B. A cause of this phase difference can be a difference in the transmission characteristics of recording systems including the magnetic heads A and B, a difference in the characteristics of head amplifiers 51 and 53, and a difference in the azimuth angles, or positions, of gaps of the magnetic heads A and B. Therefore, if a phase difference exists between two reproduced signals, when these reproduced signals are added together by adder 52, a component of the image signal is made smaller, on the same principle as that of the reduction of noise described above. Thus, the C/N ratio is not properly improved. Therefore, this embodiment is constructed in such a manner that a phase difference between a reproduced signal by magnetic head A and a reproduced signal by magnetic head B can be adjusted by a variable delay circuit 82.

In this embodiment, different from the circuit shown in FIG. 1, a constant delay circuit 81 is provided between head amplifier 51 and adder 52. Variable delay circuit 82 is provided between head amplifier 53 and AGC amplifier 57. The constant delay circuit 81 delays a phase of the output signal of head amplifier 51 by a predetermined constant amount. The variable delay circuit 82 delays a phase of the output signal of head amplifier 53. The amount of delay by the variable delay circuit 82 is controlled by the system control circuit 10. Namely, an envelop-detected output of signals outputted by adder 52 is inputted to the system control circuit 10 from the envelop detecting circuit 73. Thus, the amount of delay caused by the variable delay circuit 82 is controlled so that the envelop-detected output reaches a maximum value. Note, the constant delay circuit 81 is provided for adjusting a phase difference between reproduced signals when a phase of a signal reproduced by magnetic head B is delayed in relation to a phase of a signal reproduced by magnetic head A. The remaining construction is the same as that of the circuit shown in FIG. 1.

An operation of this embodiment is described below with reference to FIGS. 9 and 10.

Figure 9:
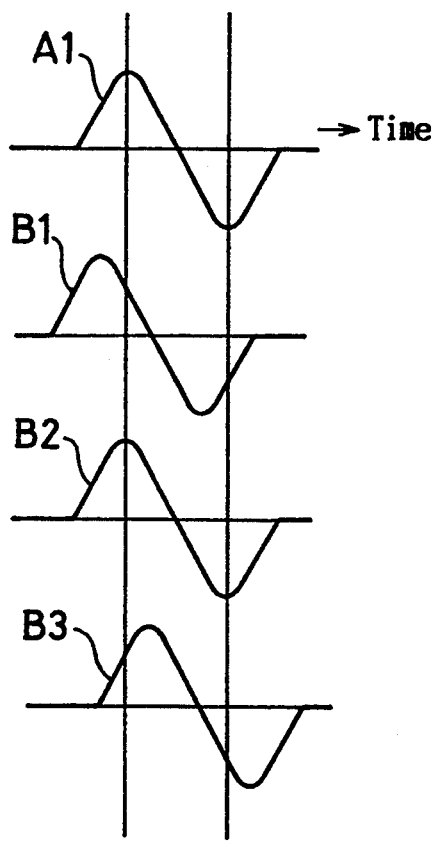
FIG. 9 is a diagram showing a phase differential of a reproduction signal of a magnetic head.
Figure 10:
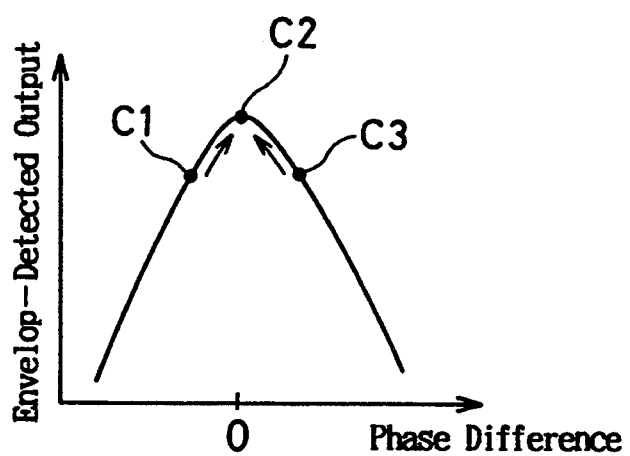
FIG. 10 is a diagram showing the relationship between a phase differential of a reproduction signal and an envelop detection output by a magnetic head.

In FIG. 9, a signal reproduced by magnetic head A is shown by reference A1, and signals reproduced by magnetic head B are shown by references B1, B2 and B3. Although a phase of the reproduced signal B2 coincides with that of the reproduced signal A1, a phase of the reproduced signal B1 is advanced relative to that of the reproduced signal A1, and a phase of the reproduced signal B3 is delayed relative to that of the reproduced signal A1. As shown in FIG. 10, the envelop-detected output reaches a maximum value when the reproduced signals A1 and B2 having phases which coincide with each other are added together (see reference C2 in FIG. 10). Conversely, when the phase is advanced, as in reproduced signal B1 (see reference C1), and the phase is delayed, as in the reproduced signal B3 (see reference C3), the envelop-detected outputs become smaller, respectively. The system control circuit 10 adjusts the amount of delay by the variable delay circuit 82 so that the envelop-detected output reaches a maximum value, i.e., an output signal of adder 52 reaches the maximum value. Thus, the effect of adder 52 is developed to the utmost, and the C/N ratio of the reproduced signals is fully improved.

In a third embodiment of the present invention, which uses the same circuit as shown in FIG. 1, the system control circuit 10 determines the kind of mode for recording image signals through the use of envelop-detected output signals, as described below.

Figure 11:
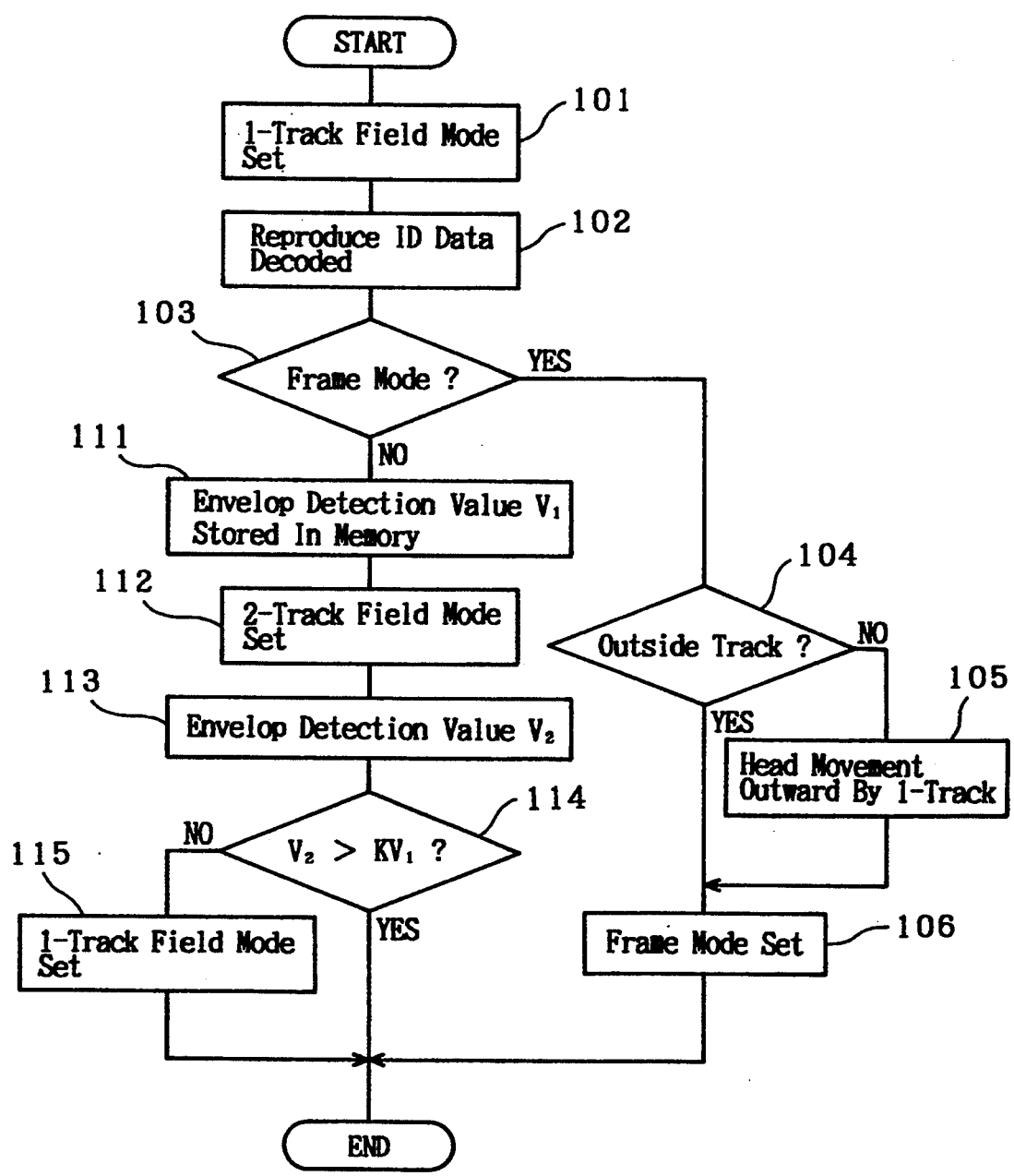
FIG. 11 is a flow chart of a first program for determining a recording mode in a magnetic disk.

FIG. 11 is a flow chart showing a program that is executed in the system control circuit 10 for determining a recording mode in the magnetic disk D. This program is executed when change switch 14a is switched to the reproduction mode, and when magnetic heads A and B are moved by head feed switch 14c.

In Step 101, the recording mode is set to the 1-track field mode, whereby a reproduction by only magnetic head A will be subsequently carried out. In Step 102, the ID data of a track reproduced by magnetic head A is decoded, and based on this ID data, it is determined in Step 103 whether the track in question is recorded under the frame mode.

When a recording of the magnetic disk D is made under the frame mode, Step 104 is executed. In the frame mode, signals corresponding to one still image are recorded in two tracks, and in Step 104 it is determined whether the track now under reproduction is the outside track of the two possible tracks, based on the ID data. When the reproduced track is not the outside track, i.e.; when magnetic head A is reproducing signals in the inside track, magnetic heads A and B are moved outward by one track in Step 105. As a result, with respect to the two tracks, magnetic head A is positioned at the outer track and magnetic head B is positioned at the inner track. Then, in Step 106, the frame mode is set and the program ended. Conversely, when it is determined in Step 104 that the reproduced track is the outside track, the flow goes directly to Step 106 and the frame mode is set. Thereafter, magnetic heads A and B are moved to predetermined track positions, and a reproduction under the frame mode can be carried out.

When it is determined in Step 103 that the track in question is not recorded under the frame mode, Step 111 is executed and the detecting output signal of the envelop detection circuit 73, i.e.; output voltage value $V_1$, is stored in a memory of the system control circuit 10. Namely, the envelop detection output of signals recorded in a track is stored in the memory. Then, in Step 112, the record mode is set to the 2-track field mode. Accordingly, the switch 54 is closed. In Step 113, output voltage value $V_2$ of the envelop detection circuit 73 is stored in the memory of the system control circuit 10. Namely, the envelop detection output of signals obtained by adding the signals recorded in the two tracks is stored in the memory.

In Step 114, the output voltage value $V_2$ of an envelop detection according to the 2-track field mode, and the output voltage value $V_1$ of an envelop detection according to the 1-track field mode, are compared, i.e.; it is determined whether the output voltage value $V_2$ is larger than the output voltage value $V_1$ multiplied by a factor K. Factor K shows the ratio of a signal inputted to adder 52 and a signal obtained by adding two signals by the adder 52. When two signals added together are the same, the factor is 1, and when two signals added together are different, the factor is about 0.7, as described in relation to noise in the reproduced signals. In this embodiment, the factor K is set to 0.9, for example.

When the output voltage value $V_2$ is larger than the output voltage value $V_1$ multiplied by 0.9, it is determined that the signals of two tracks which have been reproduced are substantially the same, i.e.; it is determined that the tracks have been recorded under the 2-track mode. Conversely, when the output voltage value $V_2$ is smaller than the output voltage value $V_1$ multiplied by 0.9, it is determined that the signals of the two tracks which have been reproduced are different, and thus, it is determined that the track has been recorded under the 1-track field mode. Accordingly, in Step 115, the 1-track field mode is set. Thus, the envelop detection output of reproduced signals added by adder 52 is compared with the envelop detection output of reproduced signals before the signals are added together, whereby it is determined whether the recording mode is the 1-track field mode or the 2-track field mode. Thus, reproduction under a predetermined mode can be executed.

As described above, according to this embodiment, even when image signals recorded under the 1-track field mode, 2-track field mode, and/or the frame mode are intermingled in one magnetic disk D, it is possible to discriminate such image signals. Accordingly, even in the above case, images can be reproduced under the mode corresponding to the mode in which they were recorded, and thus the specified images can be obtained.

Figure 12:
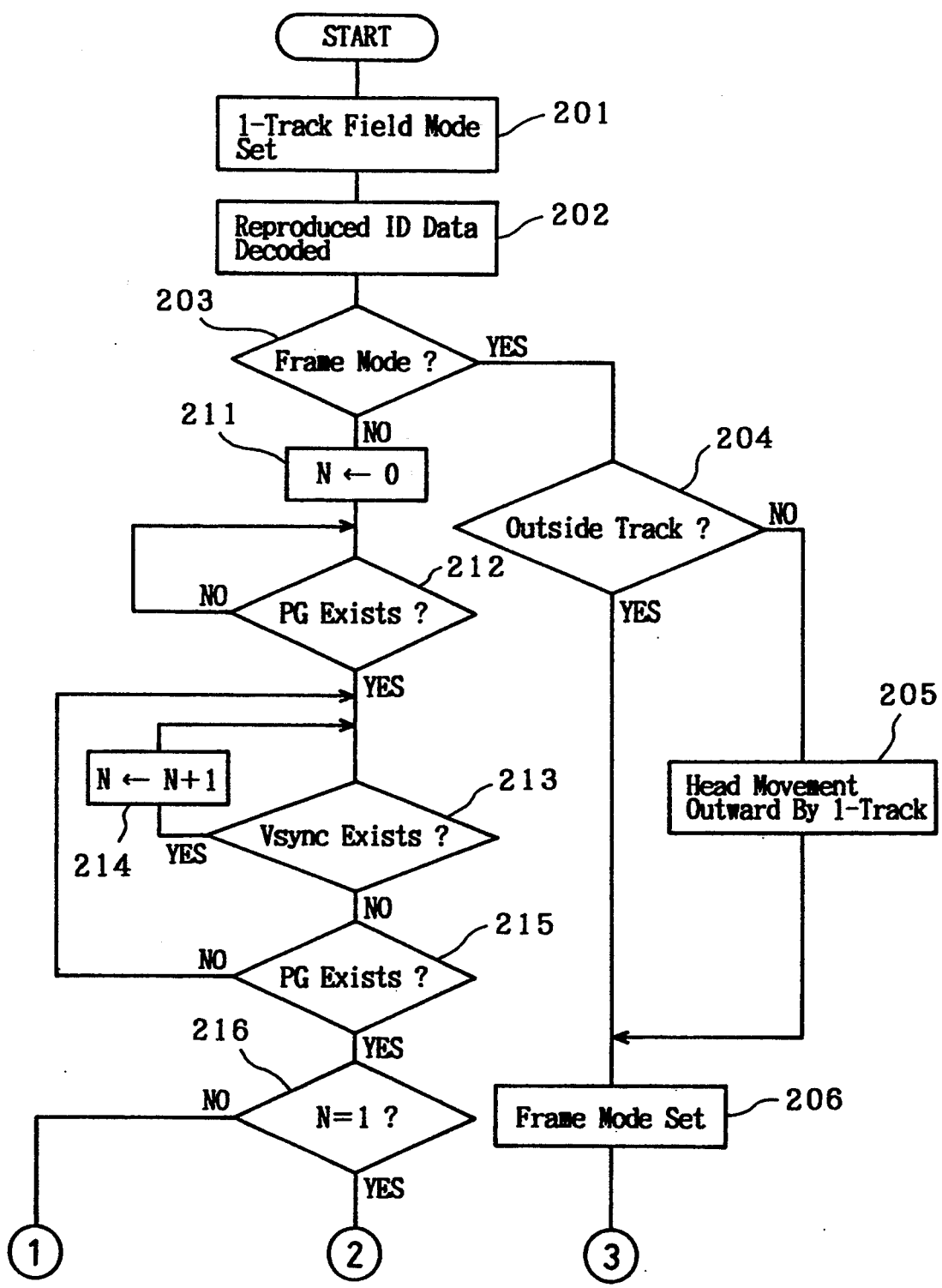
FIG. 12 is a flow chart showing a first half of a second program for determining a recording mode in a magnetic disk.
Figure 13:
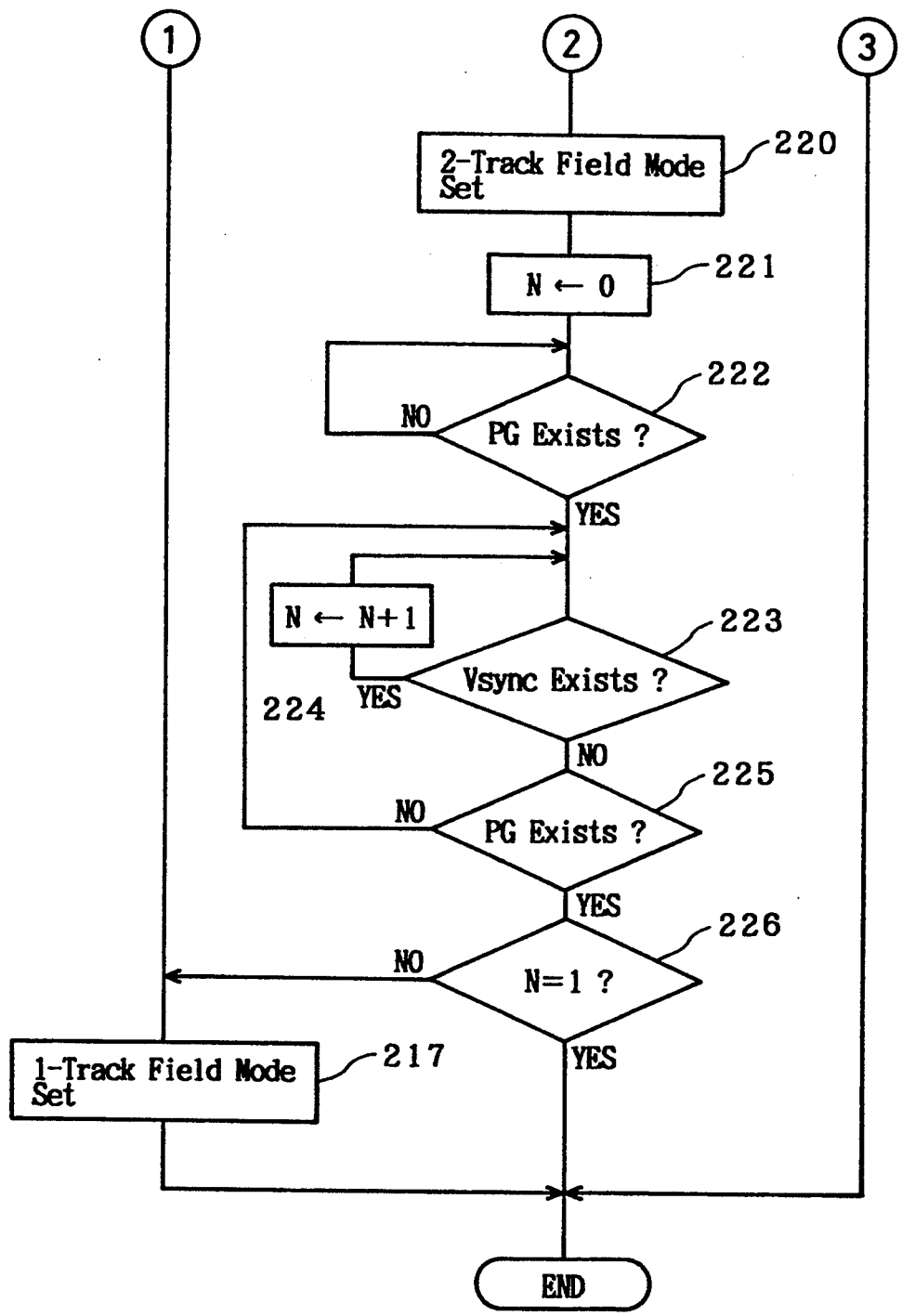
FIG. 13 is a flow chart showing a second half of the second program for determining a recording mode in a magnetic disk.

FIGS. 12 and 13 are a flow chart showing other examples of programs used for determining the mode in which image signals were recorded in the magnetic disk D. These programs, similar to the program of FIG. 11, are executed when change switch 14a is switched to the reproduction mode, and when magnetic heads A and B are moved by head feed switch 14c.

Steps 201 through 206 are identical to Steps 101 through 106 of FIG. 11, and therefore, a description thereof is omitted.

In Step 203, when it is determined that the track in question has not been recorded under the frame mode, Steps 211 through 216 are executed as described later. Thus, it is determined whether the reproduced signals are image signals.

First, in Step 211, counter N is set to zero. Then, Step 212 is executed at predetermined intervals, i.e.; it is determined whether a PG pulse has been detected at predetermined intervals. Then, if the PG pulse is detected, the number of vertical synchronizing signals Vsync is counted at Steps 213 and 214. Since Step 213 is executed at intervals which are shorter than the intervals at which the vertical synchronizing signals are generated, Step 214 is executed each time the vertical synchronizing signal Vsync is detected in Step 213. Thus, counter N is incremented by one. When no vertical synchronizing signal Vsync is detected, it is determined in Step 215 whether the PG pulse has been detected, and as long as no PG pulse is detected, Steps 213 and 214 are repeatedly executed. Accordingly, the number of vertical synchronizing signals Vsync occurring between two PG pulses is obtained.

Where the reproduced signals are image signals, the number of the vertical synchronizing signal Vsync occurring between the two pulse signals is 1. Accordingly, if counter N is not 1 in Step 216, the reproduced signals, are not image signals but are, for example, audio signals. Therefore, the process goes to Step 217 and the 1-track field mode is set. Namely, as there is no need to add the reproduction signals of two tracks by closing switch 54, only one track is reproduced.

Where counter N is 1 in Step 216, since reproduced signals are image signals, Steps 220 through 226 are executed. Thus, the recording mode is determined.

First, in Step 220, the 2-track field mode is set, i.e.; switch 54 is closed, and the signals reproduced by magnetic heads A and B are added together. Then, in Steps 221 through 225, the number of the vertical synchronizing signals Vsync occurring between the two PG pulses is counted. Note, the contents of Steps 221 through 225 are identical to those of Steps 211 though 215, and thus, a description thereof is omitted.

If identical image signals are recorded in the two tracks reproduced by magnetic heads A and B, the PG pulse and the vertical synchronized signal Vsync occur at the same timing. Therefore, in the added reproduced signals, the number of the vertical synchronizing signals Vsync occurring between the two PG signals is 1. Further, where different image signals are recorded in the two tracks reproduced by magnetic heads A and B, the vertical synchronizing signal Vsync appears at irregular frequency and the number of the vertical synchronizing signal Vsync occurring between the two PG pulses in added reproduced signals is not 1. Accordingly, it is determined in Step 226 whether counter N is 1, and when counter N is 1, because the 2-track field mode has been set, the program is immediately ended. Conversely, where counter N is not 1, the 1-track field mode is set in Step 217 and the program is ended.

As described above, according to the program shown in FIGS. 12 and 13, it is possible to determine the recording mode of signals recorded in the magnetic disk D, and the same effects are obtained as obtained by the program shown in FIG. 11.

Figure 14:
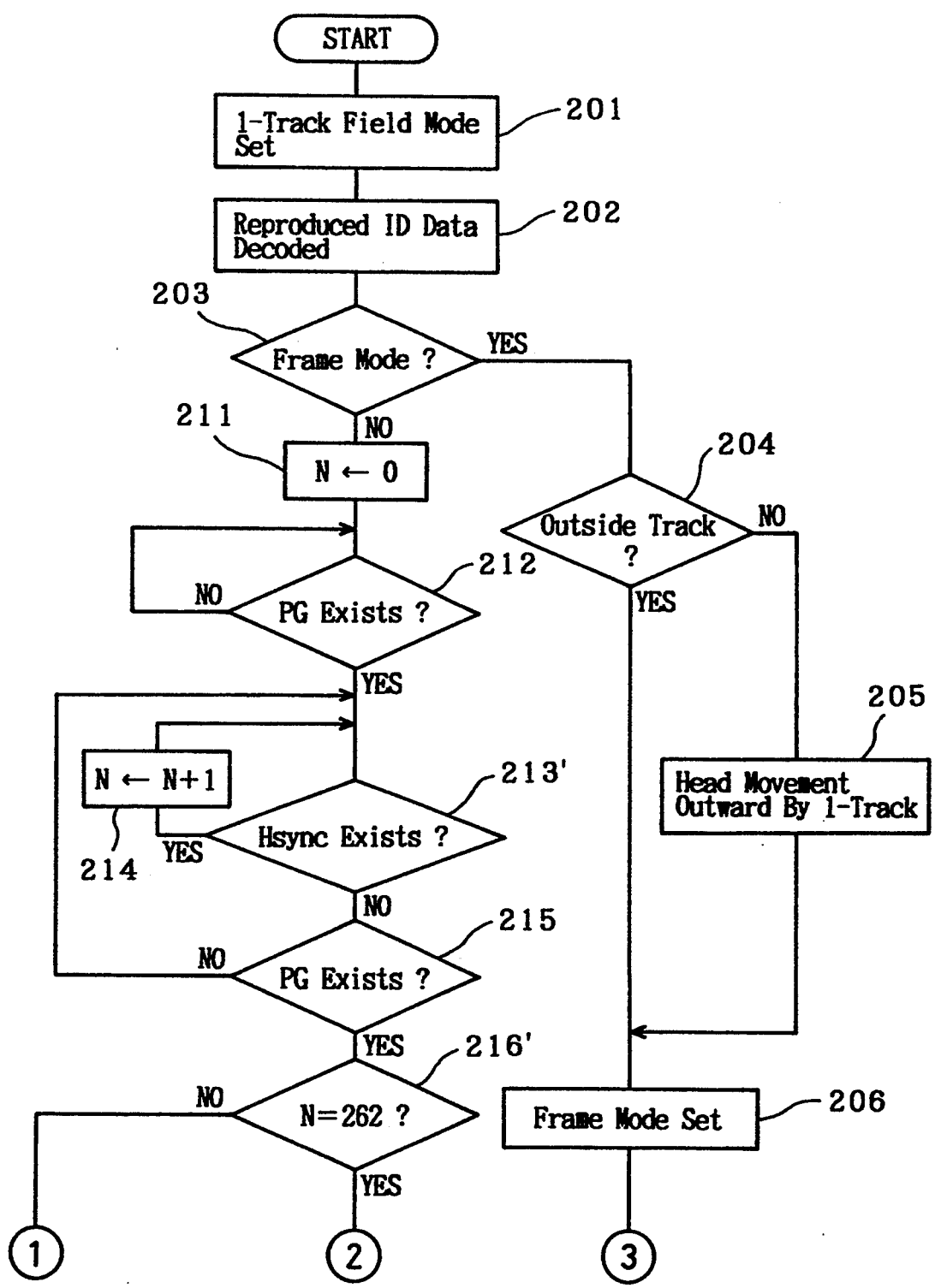
FIG. 14 is a flow chart showing a first half of a third program for determining a recording mode in a magnetic disk.
Figure 15:
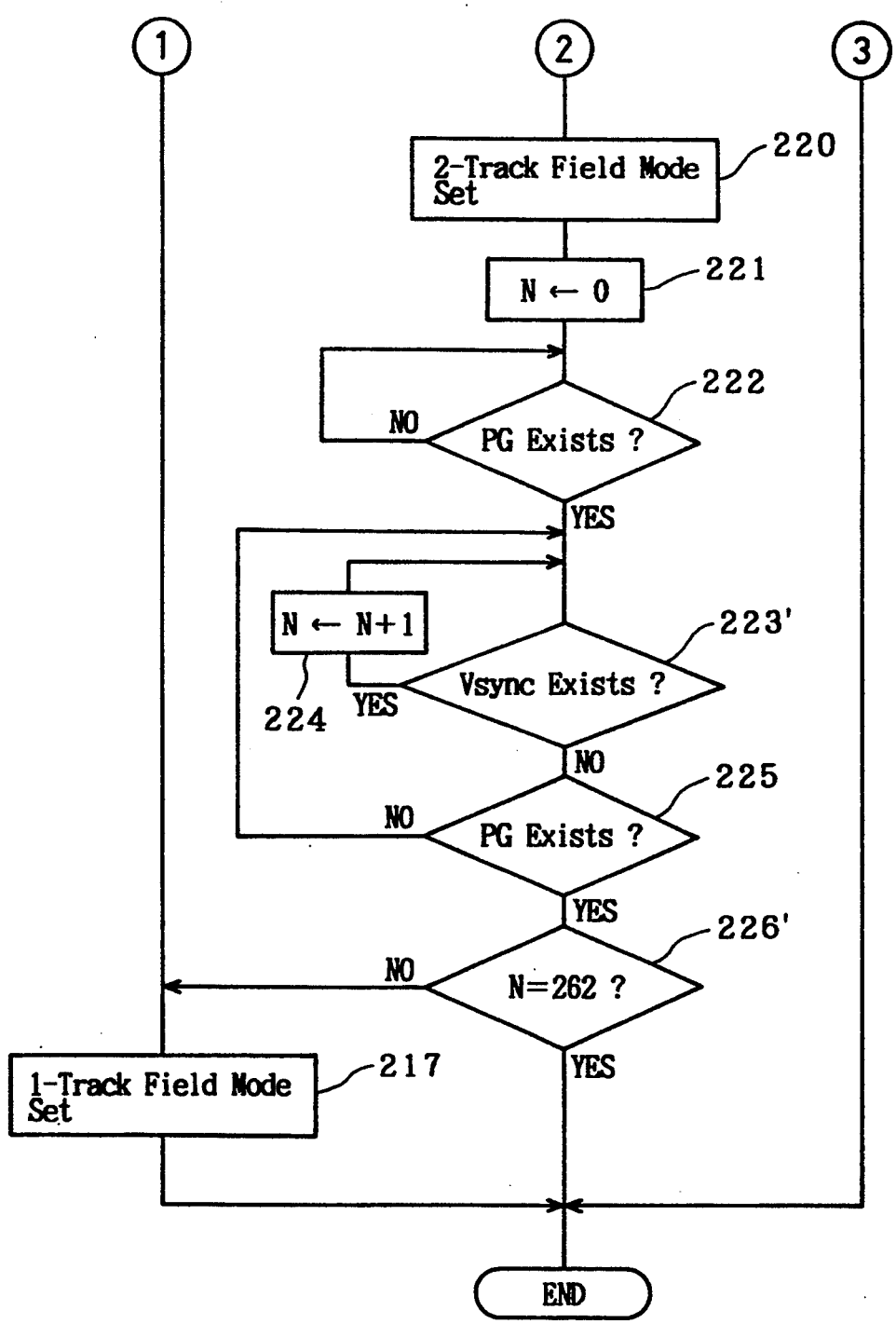
FIG. 15 is a flow chart showing a second half of the third program for determining a recording mode in a magnetic disk.

FIGS. 14 and 15 show a flow chart of still other examples of a program for determining the recording mode of the image signals recorded in the magnetic disk D. To determine the recording mode of image signals, the horizontal synchronizing signal Hsync is used in the program of FIGS. 14 and 15, instead of the vertical synchronizing signal Vsync used in the program of FIGS. 12 and 13.

In Steps 213' and 223', it is determined whether the horizontal synchronizing signal Hsync is detected. When Hsync is detected, counter N is incremented by one in each of Steps 214 and 224. In Step 216', it is determined whether the value of counter N is 262. Note, this value of counter N (=262) corresponds to the number of horizontal scanning lines in one field of television signals of the National Television System Committee (NTSC) color system. The determination in Step 216' is made because, where the reproduced signals are image signals, the number of horizontal synchronizing signals Hsync occurring between the two PG pulses is 262. Also, in Step 226', it is determined whether the value at the counter N is 262, because, when the identical image signals are recorded in the two tracks reproduced by magnetic heads A and B, the number of the horizontal synchronizing signals Hsync occurring between the two PG pulses is 262 in the added reproduced signal. The contents of the other Steps are the same as those of the respective steps of FIGS. 12 and 13. Therefore, the items corresponding thereto are shown with identical references.

According to this program, the same effects are obtained as obtained in the program of FIGS. 12 and 13.

Note, in the above embodiments, command signals RGA' and RGB' outputted to the first and the second record gates 31 and 32, thereby operate magnetic heads A and B, are generated by the gate control circuit 40, but, as an alternative, the construction can be such that the system control circuit 10 generates command signals RGA' and RGB' by using software.

Figure 16:
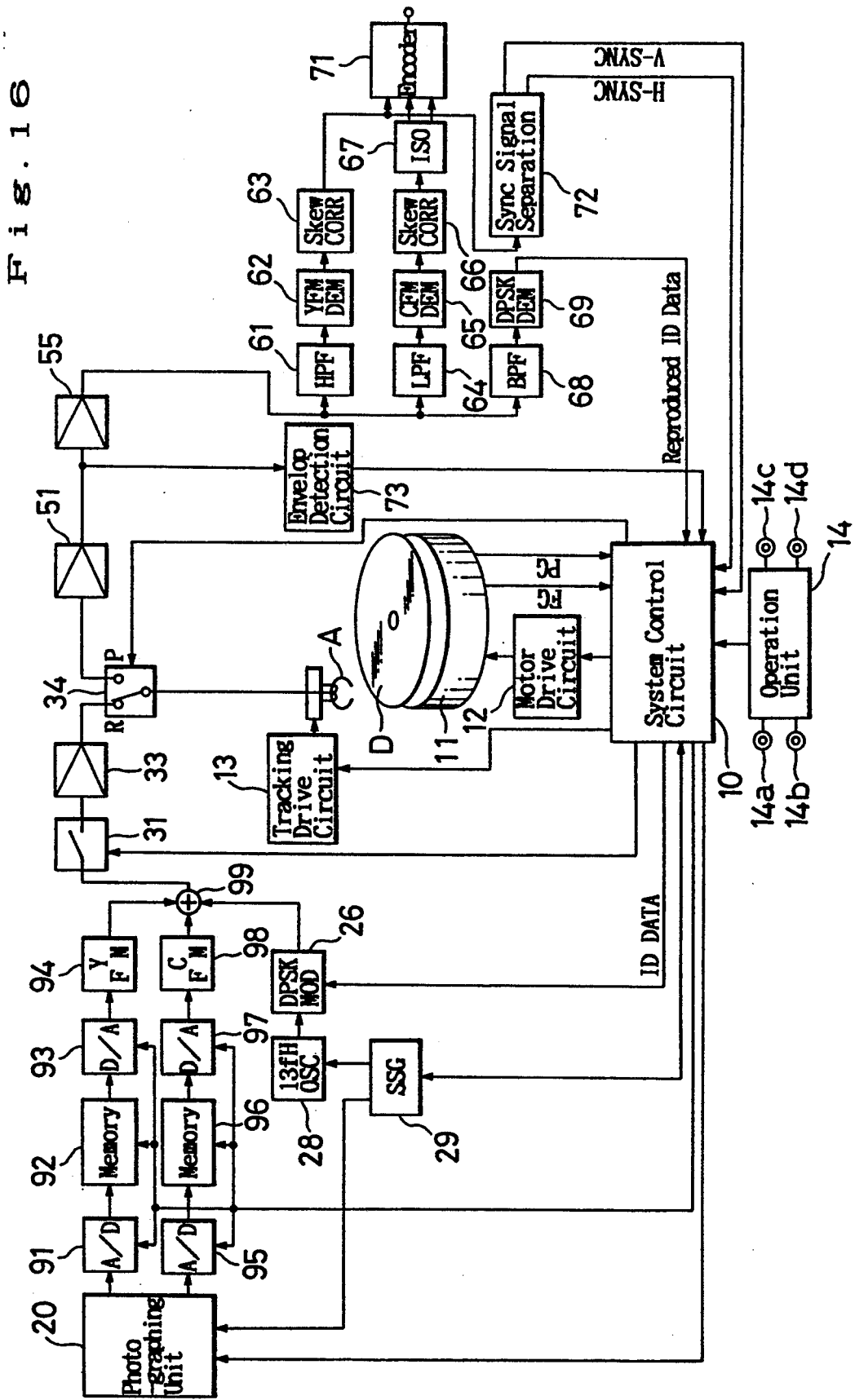
FIG. 16 is a circuit diagram showing a still video device relating to a fourth embodiment according to the present invention.

FIG. 16 shows a still video device according to a fourth embodiment of the present invention.

In this embodiment, only one magnetic head A is provided, different from the circuits shown in FIGS. 1 and 8. Namely, in this embodiment, image signals are recorded in two tracks of the magnetic disk D by one magnetic head A. Accordingly, field memories 92 and 96 are provided to store one field of signals outputted from the photographing unit 20.

A/D converters 91 and 95 are connected to photographing unit 20, whereby luminance signals and color signals outputted from the photographing unit 20 are A/D converted and stored in the field memories 92 and 96, respectively. The luminance signals and color signals stored in field memories 92 and 96 are D/A converted by D/A converters 93 and 97, respectively. Thereafter, the luminance signals and color signals are FM-modulated by a luminance signal FM modulating circuit 94 and a color signal modulating circuit 98, respectively, and superimposed by an adder 99 to form image signals. The A/D converters 91 and 95, field memories 92 and 96, and D/A converters 93 and 97 are controlled by the system control circuit 10. A DPSK signal of ID data is outputted from DPSK modulation circuit 26 and fed to adder 99, to be superimposed to the image signals. Note, since only one magnetic head A is provided, only one DPSK-modulating circuit 26 is provided. Further, only one adder 99 is provided, since the superimposing of the luminance signal and the color signal and the superimposing of the ID data are carried out at the same time. Accordingly, only one record gate 31 and one switch 34 are provided, respectively. Note, adder 52 (FIG. 1) for superimposing reproduction signals is not provided. The remaining construction is the same as that of the first embodiment shown in FIG. 1.

In this embodiment, signals of a field are once stored in the field memories 92 and 96, and are then recorded in a predetermined track through the magnetic head A. After the recording is completed, magnetic head A is moved to the next track. Then, the signals stored in field memories 92 and 96 are recorded in this track. Note, the ID data outputted from the system control circuit 10 at this time includes the track number corresponding to the recorded track and is superimposed on the image signals by the adder 99.

According to this embodiment, the same effects are obtained as those obtained by the embodiments described with reference to the above drawings.

Note, in each of the above embodiments, the magnetic disk D is used as the recording medium, but the present invention is not restricted thereto, and the present invention is applicable to, for example, still video devices in which a magnetic tape, an IC-card, etc., are used as recording media.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. HEI 2-414128, HEI 2-414129, HEI 2-414130 (all filed on Dec. 10, 1990) which are expressly incorporated herein by reference in their entirety.

I claim:

1. A still video device for reproducing an image signal recorded on a recording medium which can be reproduced both in a first mode and in a second mode, said first mode being such that one image signal corresponding to a still image is recorded on one track of said recording medium through one head of at least two heads, said second mode being such that at least two identical image signals corresponding to a single still image are recorded on at least two tracks of said recording medium at substantially the same time through said at least two heads that are separated by a predetermined distance, said still video device comprising:

means for reproducing at least two image signals recorded on said at least two tracks of said recording medium at substantially the same time;

means for adding said at least two image signals reproduced by said reproducing means together to obtain a combined signal; and means for determining whether said at least two image signals differ based upon an envelope detected output of said combined signal, indicating that said at least two image signals added together to obtain said combined signal are recorded in said first mode, or whether said at least two image signals are identical, indicating that said at least two image signals added together to obtain said combined signal are recorded in said second mode.

2. The still video device of claim 1, wherein said recording medium comprises a magnetic disk.

3. The still video device of claim 1, further comprising:

means for obtaining an envelop detected output of said at least two image signals added by said adding means; and means for controlling a phase of said at least two image signals reproduced by said reproducing means so that said envelop detected output obtained by said obtaining means reaches a maximum value.

4. The still video device of claim 1, wherein said determining means determines whether said at least two image signals are recorded in said first mode or said second mode in accordance with a number of synchronizing signals of said at least two image signals that are added together by said adding means.

5. The still video device of claim 2, further comprising a plurality of magnetic heads for reproducing said at least two image signals recorded on said magnetic disk.

6. The still video device of claim 1, wherein said first mode comprises a one-track field mode and said second mode comprises a two-track field mode.

* * * * *